(12) United States Patent
Shaffer et al.

(10) Patent No.: US 8,331,540 B2
(45) Date of Patent: Dec. 11, 2012

(54) VOICEMAIL SYSTEM WITH QUALITY ASSURANCE

(75) Inventors: Shmuel Shaffer, Palo Alto, CA (US); Michael P. O'Brien, Manasquan, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1399 days.

(21) Appl. No.: 11/651,678

(22) Filed: Jan. 9, 2007

(65) Prior Publication Data

US 2008/0165935 A1 Jul. 10, 2008

(51) Int. Cl.
*H04M 11/00* (2006.01)
(52) U.S. Cl. ............. 379/88.18; 379/88.08; 370/395.21
(58) Field of Classification Search ............. 379/1.02, 379/88.01–88.04, 88.18, 88.08, 88.09, 88.16, 379/88.22, 88.25, 88.26; 725/89; 455/67.11; 370/252, 253, 356, 395.21; 709/224
See application file for complete search history.

(56) References Cited

U.S. PATENT DOCUMENTS

| | | | | |
|---|---|---|---|---|
| 5,802,149 | A * | 9/1998 | Hanson | 379/88.03 |
| 6,952,406 | B2 * | 10/2005 | Procopio | 370/252 |
| 7,483,520 | B2 * | 1/2009 | Han et al. | 379/88.03 |
| 2004/0228456 | A1 * | 11/2004 | Glynn et al. | 379/88.01 |
| 2005/0243975 | A1 * | 11/2005 | Reich et al. | 379/88.01 |
| 2006/0184983 | A1 * | 8/2006 | Casey | 725/89 |

OTHER PUBLICATIONS

Series P: Telephone Transmission Quality, Telephone Installations, Local Line Networks, Objective measuring apparatus, 67 pages, May 2004, ITU-T P.563, Telecommunication Standardization Sector of ITU.
Malfait, Ludovic, et al., "P.563—The ITU-T Standard for Single-Ended Speech Quality Assessment" 11 pages, IEEE Transactions on Audio, Speech, and Language Processing, vol. 14, No. 6, Nov. 2006.

* cited by examiner

*Primary Examiner* — Md S Elahee
(74) *Attorney, Agent, or Firm* — Fish & Richardson P.C.

(57) ABSTRACT

In one embodiment, a method for ensuring quality of a media message is provided. The method includes receiving information for a media message. At least a portion of the media is analyzed to determine a media quality for the media message. The method then determines if the media quality is acceptable. If the media quality is not acceptable, then an alert may be sent regarding the media quality of the media message. For example, a caller may be prompted to re-record a media message.

32 Claims, 3 Drawing Sheets

VOICEMAIL SYSTEM WITH QUALITY ASSURANCE

TECHNICAL FIELD

Particular embodiments generally relate to telecommunications.

BACKGROUND

As callers leave media messages using a media system, most systems monitor the power of the recorded message. If the power of the message is below a preconfigured threshold, the media system alerts the caller that the recipient may have a hard time understanding the message. For example, the media system may play a suitable prompt, such as "We did not receive your message. Please press 1 and re-record the message at the sound of the beep."

Power monitoring is used because old systems wanted to save disk space and because this simple measurement requires little CPU processing power. Measuring the power may be acceptable for detecting silence; however, additional factors may affect the quality of a media message other than power. Thus, even if power is monitored, a recipient may still not be able to understand a media message.

DESCRIPTION OF EXAMPLE EMBODIMENTS

Overview

In one embodiment, a method for ensuring voice quality of a media message is provided. The method includes receiving information for a media message. At least a portion of the information is analyzed to determine voice quality for the media message. The method then determines if the voice quality is acceptable. If the voice quality is not acceptable, then an alert may be sent regarding the voice quality of the media message. For example, a caller may be prompted to re-record a media message.

Example Embodiments

Figure 1:
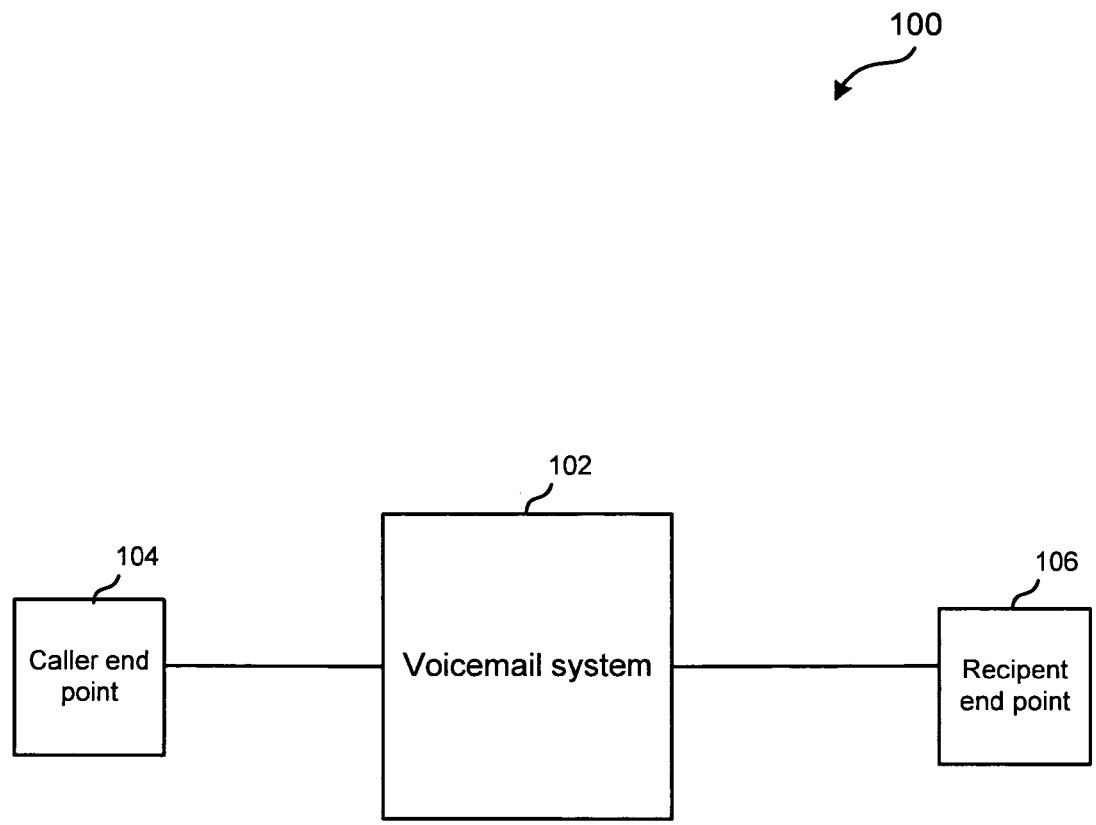
FIG. 1 depicts an example system for providing quality assurance for a media system.

FIG. 1 depicts an example system 100 for providing quality assurance for a voicemail system 102. A caller end point 104 may contact voicemail system 102. A caller may use caller end point 104 to record/leave a message for a recipient. A recipient may use a recipient device 106 to listen to a media message left using voicemail system 102.

Voicemail system 102 may be any system that allows media messages to be recorded. For example, voicemail system 102 may include a media is connected to caller end point 104. A caller may then use caller end point 104 to record and store a media message with voicemail system 102. Although a "voicemail system" is discussed, it will be understood that any system that can store media for quality analysis may be used, such as a unified messaging system, instant messaging system, etc. The media message may include any data in any form. For example, the media message may be a voice message, video message, any multimedia message, etc.

Caller end point 104 may be any device/application that can leave/record a media message. For example, caller end point 104 may include a cellular phone, PSTN phone, instant messaging client with voice enabled, laptop computer application, VoIP telephone, video phone, etc.

In one embodiment, caller end point 104 may attempt to contact a recipient. If the recipient does not answer the call, then voicemail system 102 picks up the call (e.g., the call is redirected to a voicemail server).

Voicemail system 102 includes an interactive voice response (IVR) system that may allow a caller to leave a media message for the recipient. A menu system is provided that allows the caller to record/leave a media message.

Particular embodiments analyze information for a media message being left to determine the media message's media quality. Media quality is measured in real-time as a caller leaves a message that is audible (i.e., has enough power) but the media quality may be poor. The media quality may be any analysis on the quality of the media message. For example, the recording quality of the media message is analyzed. This may analyze the voice quality of the media message. Further, the media quality may analyze other aspects of the media quality, such as whether the video can be understood (either voice or video quality). If a message is considered to have poor media quality, the message may be hard to understand for various reasons. For example, when a caller is using a cellular phone, there may be a poor connection when leaving the message. Thus, the caller's voice may be muffled, garbled, robotic sounding, etc. When a recipient listens to a media message with poor media quality, the recipient may not be able to understand or comprehend what the caller has sent e.g., what the caller has spoken, sent in a video, etc.). This is different than when the power is low in that either nothing was said or the recipient cannot hear audio in the media message that was left.

When the voicemail system 102 determines that the media quality is unacceptable for a media message, then it may send an alert indicating that the media quality is not acceptable. For example, voicemail system 102 may send a prompt to a caller indicating that the media quality is not acceptable and suggest that the caller may want to re-record a new message. Accordingly, the caller may record another message in place of the already left message.

Figure 2:
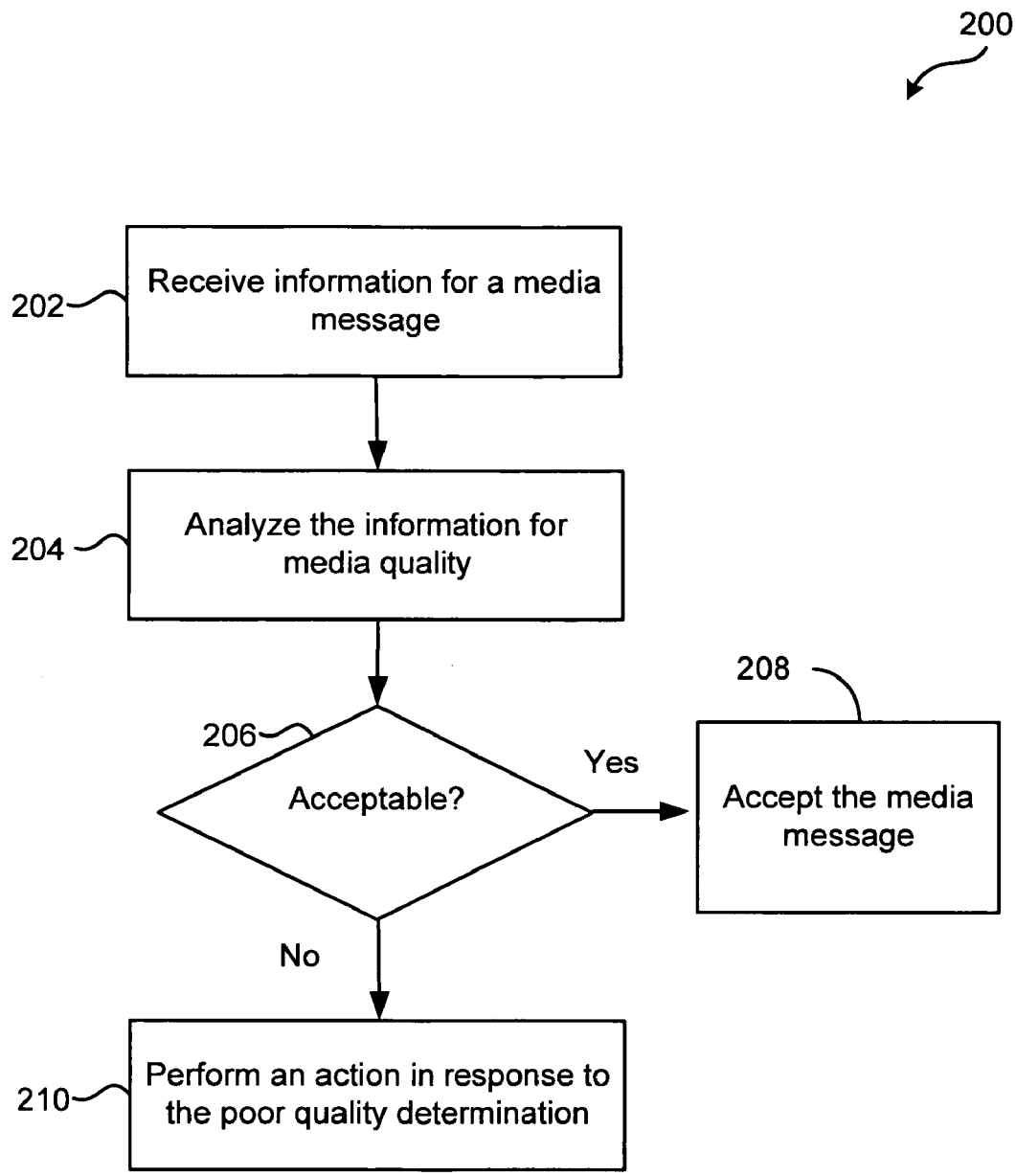
FIG. 2 shows an example of a method for determining voice quality.

FIG. 2 shows an example of a method 200 for determining media quality. Step 202 receives media for a media message. The media received for the media message may be media from the actual media message being left by the caller. For example, packets of media may be received with audio information for the media message. Also, the information may be data other than the actual media message spoken by the caller. For example, the information may be numbers of packets lost, transmission channel errors, a noise reading, transcoding information, delay in packets being sent, short-term and long-term warping of a speech signal, a frequency signature of the media, a speech recognition of the audio of the media message, etc.

Step 204 then analyzes the information media quality. Various methods may be used to analyze the media quality. For example, voice quality algorithms that measure the quality of voice may be used. In one embodiment, algorithms described in the standards ITU P.VTQ or P.563 for analyzing voice quality (VQ) may be used. An example of the P.563 standard is described in ITU P.563 recommendation "Single-ended Method for Objective Speech Quality Assessment in Narrowband Telephony applications", which is incorporated by reference in their entirety for all purposes.

In one embodiment, the algorithms may accurately detect the following: impairments of packet loss and packet loss concealment with code-excited linear prediction (CELP) codecs, transmission channel errors, environmental noise at the sending side, transcodings, effect of varying delay on listening quality in absolute category rating (ACR) tests, short-term time warping of a speech signal, long-term time warping of a speech signal, etc. Other impairments may also be detected. For example, a robotic voice signature that may be caused by packet loss concealment may also be detected.

Other analysis may also be used. For example, natural language recognition (NLR) may be used to parse the recorded media message. If voicemail system 102 has difficulty deciphering parts of the message, then it may be determined that the media quality is poor.

In another embodiment, voicemail system 102 may identify segments in the media message that contain poor media quality by estimating poor cellular connectivity. For example, certain signature or frequencies of a spectrum filter suggest that voice may be distorted.

Further, packet loss concealment may be used. In VoIP, packets may be lost along the way to voicemail system 102. If enough packets are lost, then it may be assumed that there is poor media quality.

In another specific embodiment, step 204 may utilize video quality analyzing algorithms. Various methods may be used to analyze the video quality. For example, video quality algorithms that measure the quality of video may be used. In one embodiment, algorithms described in the standards ITU STUDY GROUP 9 of the Video Quality Experts Group (VQEG) for analyzing video quality (VQ) may be used. The "final Report from the Video Quality Experts Group on the Validation of Objective Models of Video Quality Assessment" is incorporated by reference in their entirety for all purposes. This report describes the results of the evaluation process of objective video quality models as submitted to the Video Quality Experts Group (VQEG). The report describes models to be used in the calculation of objective scores for comparison with subjective evaluation over a broad range of video systems and source sequences.

Step 206 then determines if the media quality is acceptable. For example, the analysis in step 204 may provide a measurement data point. This data point may be compared to a threshold to determine whether the media quality is acceptable or not. For example, if a number of packets are lost above a certain threshold, it may be determined that the media quality is poor. Also, any of the impairments discussed above may be compared to a threshold to determine if media quality is poor or not. Further, in speech recognition, if a large number of words are not recognized above a threshold, then it may be determined that the recipient may have trouble understanding the media message and thus it may be considered of poor media quality.

In one embodiment, segments of a media message may be analyzed for media quality. Instead of analyzing the entire message as a whole, short segments may be analyzed for media quality rather than analyzing the average overall quality of a media message. For example, voicemail system 102 may treat the overall media message as a sequence of a number of segments and may measure the media quality of each segment. If voicemail system 102 determines that any of the segments include poor media quality, then these segments may be flagged as being of poor media quality. However, segments that are of acceptable media quality may not be flagged.

If the media message is considered acceptable, step 208 accepts the media message. For example, the whole media message or none of the segments of the media message may have been considered to be poor.

If the media message is not considered acceptable, then step 210 performs an action in response to the poor quality determination, such as sending an alert indicating that it was determined that the media message was not considered acceptable. If the entire message is considered poor (or the determination was averaged for the entire media message), then the caller may be asked to re-record the media message again. Also, different way of treating segments of poor quality may be used. For example, the caller may be asked to re-record the segments that were considered of a poor quality. Also, the caller may be able to re-record the entire message from the beginning even though only a few segments were considered unacceptable.

Another option may be that the caller can listen to the segments or the entire media message and determine if the media quality is acceptable. If the media quality is acceptable, the caller may commit it to voicemail system 102. If the media quality is not acceptable, then the caller may re-record a new message.

A selective analysis of media quality may also be performed. For example, voicemail system 102 may detect when a media message is being left from a medium that may result in poor media quality. In one example, voicemail system 102 may detect that a caller is leaving a message from a mobile phone. This may be performed by using the caller ID of incoming calls to determine if the call originates from a mobile phone. Thus, users in media in which it is not likely that poor media quality results may not have to deal with false positives indicating that media quality is poor. For example, callers using PSTN telephones may not need to have their media quality analyzed. Also, carriers may provide analysis on certain calls, such as a phone company may provide quality assurance on calls between two end points it owns. This may provide better voice quality for customers using the same phone company. However, if the call is from an end point from another carrier, the quality assurance may not be provided.

Figure 3:
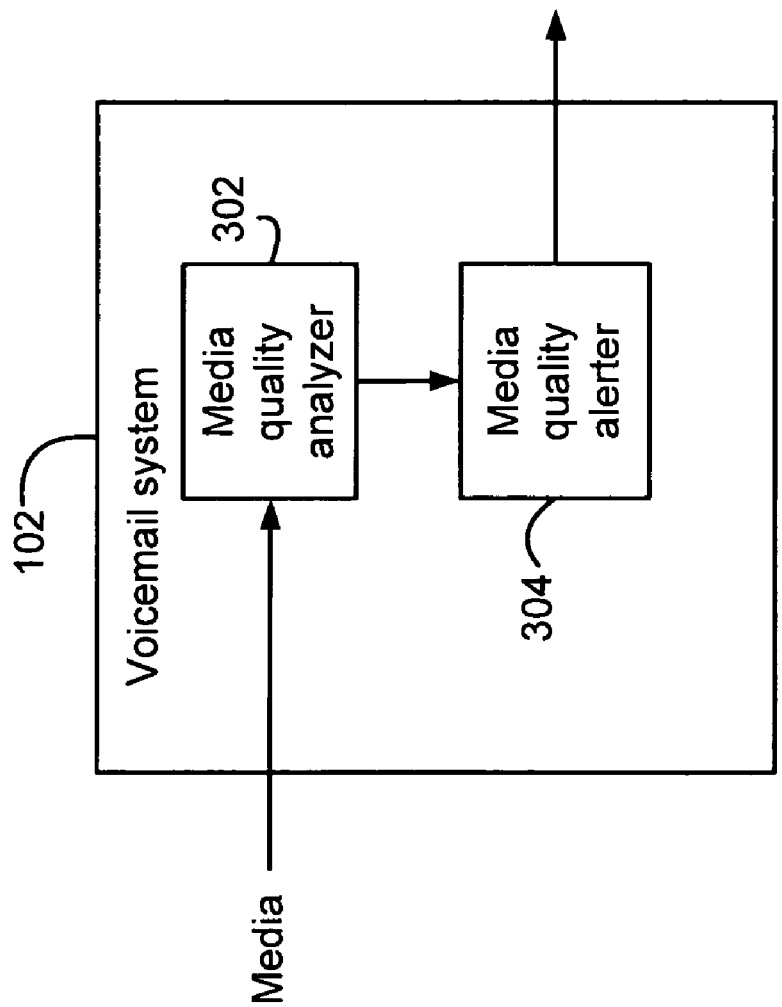
FIG. 3 depicts a more detailed example of the media system.

FIG. 3 depicts a more detailed example of voicemail system 102. As shown, a media quality analyzer 302 and a media quality alerter 304 are provided. Media quality analyzer 302 is configured to receive information for the media message. Media quality analyzer 302 then analyzes the information for media quality. It can then determine if the media quality is acceptable or not.

If the media quality is not acceptable, then media quality alerter 304 is configured to alert a caller of the poor media quality. Media quality alerter 304 may then give the caller options of checking the media for media quality, re-recording the message, etc.

Accordingly, particular embodiments provide many advantages. When a caller leaves a media message and hangs up, the caller cannot go back and change the message that has been left in the recipient's voicemail box. Thus, it is important to ensure that the media quality of the media message being left is acceptable while the caller is connected to voicemail system 102. Thus, real time media quality assurance is provided using particular embodiments. If it is detected that media quality is poor, then the caller may be alerted before disconnecting from voicemail system 102. This may allow a caller to re-record a media message if the media quality is poor. This ensures that media messages left are of good voice quality.

Checking the quality of a recorded message is useful as new media are being used to make calls, such as VoIP, cellular, video phones, land mobile radios (LMR), etc. These new media may not be as reliable as other technologies. Further, the intercommunication between end points in different mediums may not always produce the highest quality voice calls. Thus, ensuring that voice quality is acceptable may be more important than detecting silence (e.g. the power).

Also, particular embodiments may be useful when quality assurance is imperative in media recordings. For example, some fields require recording and storing of all media messages for regulatory or legal reasons. Also, for legal reasons, some companies may need to keep media messages. If the stored messages have poor voice quality, their usefulness may be degraded. Thus, techniques to ensure good recording quality are desirable.

Although the description has been described with respect to particular embodiments thereof, these particular embodiments are merely illustrative, and not restrictive. For example, although media messages are described, any message may be analyzed using particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

While particular embodiments have been described herein with reference to voice, video, and media, it will be appreciated that any of the embodiments is equally applicable to any of these media and when applicable the words voice, video, and media are interchangeable.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   receiving, using a voicemail system associated with a called party, a call from a calling party to the called party, wherein the call is redirected to the voicemail system based on the called party not answering the call, the voicemail system configured for recording messages left by callers for the called party;
   recording, using the voicemail system, a message being left by the calling party for the called party;
   analyzing, using the voicemail system and while the message is being left by the calling party, information associated with at least a portion of media included in the message to determine a quality of the media included in the message, wherein the analyzing comprises using algorithms to detect one or more of impairments of packet loss and packet loss concealment;
   based on the analysis of the information, determining, using the voicemail system, whether the quality of the media included in the message being left by the calling party for the called party satisfies one or more pre-determined thresholds; and
   based on a determination that the quality of the media included in the message being left by the calling party for the called party does not satisfy the one or more pre-determined thresholds:
      generating an alert indicating that the voicemail system has determined that the quality of the media included in the message is not acceptable, and
      sending the alert to the calling party.

2. The method of claim 1, wherein the message comprises audio or video information, wherein determining if the quality associated with the message is acceptable comprises determining whether a quality measurement of the audio or video information is acceptable.

3. The method of claim 1, wherein determining the quality of the media included in the message and sending the alert are performed before the calling party disconnects with the voicemail system.

4. The method of claim 1, wherein sending the alert comprises sending a message to the calling party indicating the quality of the media is determined to be not acceptable.

5. The method of claim 4, further comprising providing the calling party an option to re-record at least a portion of the message.

6. The method of claim 1, wherein analyzing at least a portion of the media to determine the quality associated with the message comprises determining a media quality measurement value, wherein determining if media quality is acceptable comprises comparing media quality measurement value to a threshold to determine if the media quality is acceptable or not.

7. The method of claim 1, wherein analyzing at least a portion of the media to determine the quality of the media included in the message comprises:
   analyzing one or more segments of the message; and
   determining a quality of the media included in each of the one or more segments of the message.

8. The method of claim 7, further comprising sending an alert for a segment in the one or more segments if the quality of the media included in the segment is determined to be unacceptable.

9. The method of claim 7, wherein analyzing at least a portion of the media to determine the quality of the media included in the message comprises using natural language recognition to determine a voice quality of the media included in the message.

10. The method of claim 8, wherein analyzing at least a portion of the media to determine the quality of the media included in the message comprises using real-time voice quality algorithms to determine the quality of the media included in the message.

11. The method of claim 1, wherein the information associated with media included in the message is selected from a group including numbers of packets lost, transmission channel errors, a noise reading, transcoding information, a delay in packets being sent, short-term and long-term warping of a speech signal, a frequency signature of the media and a speech recognition of an audio of the media message.

12. The method of claim 1, wherein analyzing the information associated with at least a portion of the media further comprises using algorithms to detect one or more of: packet loss concealment with code-excited linear prediction (CELP) codecs, transmission channel errors, environmental noise at the sending side, transcodings, effect of varying delay on listening quality in absolute category rating (ACR) tests, short-term warping of a speech signal, long-term warping of a speech signal and a robotic voice signature that may be caused by packet loss concealment.

13. The method of claim 1, further comprising:
   based on a determination that the quality of the media included in the message satisfies the one or more pre-determined thresholds, accepting the message using the voicemail system.

14. The method of claim 1, wherein the recorded message is configured to be accessed by the called party after the calling party completes the recording of the message.

15. An apparatus comprising:
   one or more processors; and
   logic encoded in one or more non-transitory computer-readable storage media for execution by the one or more processors and when executed operable to:
      receive, using a voicemail system associated with a called party, a call from a calling party to the called party, wherein the call is redirected to the voicemail system based on the called party not answering the call, the voicemail system configured for recording messages left by callers for the called party;

record, using the voicemail system, a message being left by the calling party and for the called party;

analyze, using the voicemail system and while the message is being left by the calling party, information associated with at least a portion of media included in the message to determine a quality associated with the media included in the message, wherein the analyzing comprises using algorithms to detect one or more of impairments of packet loss and packet loss concealment;

based on the analysis of the information, determining, using the voicemail system, whether the quality of the media included in the message being left by the calling party for the called party satisfies one or more pre-determined thresholds; and based on a determination that the quality of the media included in the message being left by the calling party for the called party does not satisfy the one or more pre-determined thresholds:

generating an alert indicating that the voicemail system has determined that the quality of the media included in the message is not acceptable, and send the alert to the calling party.

16. The apparatus of claim 15, wherein the message comprises audio or video information, wherein the logic to determine whether the quality associated with the message satisfies one or more pre-determined thresholds comprises determining whether a quality measurement of the audio or video information is acceptable.

17. The apparatus of claim 15, wherein the logic to determine the quality of the media included in the message and send the alert is executed before the calling party disconnects with the voicemail system.

18. The apparatus of claim 15, wherein the logic when executed is further operable to send a message to the calling party indicting the quality of the media is determined to be not acceptable.

19. The apparatus of claim 18, wherein the logic when executed is further operable to provide the calling party an option to re-record at least a portion of the message.

20. The apparatus of claim 15, wherein the logic when executed is further operable to determining a media quality measurement value, wherein determine if the media quality is acceptable comprises comparing the media quality measurement value to a threshold to determine if the media quality is acceptable or not.

21. The apparatus of claim 15, wherein the logic when executed is further operable to:

analyze one or more segments of the message; and determine a quality of media included in each of the one or more segments of the message.

22. The apparatus of claim 21, wherein the logic when executed is further operable to send an alert for a segment in the one or more segments if the quality of the media included in the segment is determined to be unacceptable.

23. The apparatus of claim 15, wherein the logic when executed is further operable to use natural language recognition to determine the quality of the media included in the message.

24. The apparatus of claim 15, wherein the logic when executed is further operable to use real-time media quality algorithms to determine the media quality of the media included in the message.

25. The apparatus of claim 15, wherein the logic when executed is further operable to select the information associated with media included in the message from a group including numbers of packets lost, transmission channel errors, a noise reading, transcoding information, a delay in packets being sent, short-term and long-term warping of a speech signal, a frequency signature of the media and a speech recognition of an audio of the media message.

26. The apparatus of claim 15, wherein the logic when executed is further operable to analyze the information associated with at least a portion of the media using algorithms to detect one or more of:

packet loss concealment with code-excited linear prediction (CELP) codecs, transmission channel errors, environmental noise at a sending side, transcodings, an effect of varying delay on listening quality in absolute category rating (ACR) tests, a short-term warping of a speech signal, a long-term warping of a speech signal and a robotic voice signature created from a packet loss concealment.

27. The apparatus of claim 15, wherein the recorded message is configured to be accessed by the called party after the calling party completes the recording of the message.

28. The apparatus of claim 15, wherein the logic when executed is operable to:

based on a determination that the quality of the media included in the message satisfies the one or more pre-determined thresholds, accept the message using the voicemail system.

29. An apparatus comprising:

a receiver configured to receive, using a voicemail system associated with a called party, a call from a calling party to the called party, wherein the call is redirected to the voicemail system based on the called party not answering the call, the voicemail system configured for recording messages left by callers for the called party;

a recorder configured to record, using the voicemail system, a message being left by the calling party for the called party;

means for analyzing, using the voicemail system and while the message is being left by the calling party, information associated with at least a portion of media included in the message to determine a quality associated with the media included in the message, wherein the analyzing comprises using algorithms to detect one or more of impairments of packet loss and packet loss concealment;

based on the analysis of the information, a processor configured to determine, using the voicemail system, whether the quality of the media included in the message being left by the calling party for the called party satisfies one or more pre-determined thresholds;

based on a determination that the quality of the media included in the message being left by the calling party for the called party satisfies the one or more pre-determined thresholds, the processor configured to accept the message using the voicemail system; and based on a determination that the quality of the media included in the message being left by the calling party for the called party does not satisfy the one or more pre-determined thresholds, the processor being further configured generate an alert indicating that the voicemail system has determined that the quality of the media included in the message is not acceptable, and process instructions to send the alert to the calling party.

30. A method comprising:

receiving, using a media system associated with a called party, a call from a calling party to the called party, wherein the call is redirected to the media system based on the called party not answering the call, the voicemail system configured for recording messages left by callers for the called party;

recording, using the media system, a video message being left by the calling party for the called party;

receiving, using the media system, information associated with media contained in the video message;

analyzing, using the media system and while the video message is being left by the calling party, information associated with at least a portion of the media to determine a quality associated with the video message, wherein the analyzing comprises using algorithms to detect one or more of impairments of packet loss and packet loss concealment;

based on the analysis of the information, determining, using the media system, whether the quality of the media included in the video message being left by the calling party for the called party satisfies one or more pre-determined thresholds;

based on a determination that the quality of the media included in the video message being left by the calling party for the called party satisfies the one or more pre-determined thresholds, accepting the video message using the media system; and based on a determination that the quality of the media included in the video message being left by the calling party for the called party does not satisfy the one or more pre-determined thresholds, generating an alert indicating that the media system has determined that the quality of the media included in video the message is not acceptable, and sending the alert to the calling party.

31. The method of claim 30, wherein analyzing information associated with at least a portion of the media to determine the quality associated with the video message comprises using algorithms described in standards ITU STUDY GROUP 9 of Video Quality Experts Group (VQEG) for analyzing video quality.

32. The method of claim 30, wherein the recorded message is configured to be accessed and reviewed by the called party after the calling party completes the recording of the message.

* * * * *